Fig. 1.

No. 619,632. Patented Feb. 14, 1899.
J. E. THEBAUD.
INDICATING AND RECORDING MECHANISM FOR MEASURING FLUIDS IN MOTORS, &c.
(Application filed Feb. 28, 1898.)
(No Model.) 5 Sheets—Sheet 2.

Fig. 2.

Witnesses
O. B. Butler
T. M. Nickerden

Inventor
JOHN EDWARD THEBAUD
By his Attorney
W. T. Miller

No. 619,632. Patented Feb. 14, 1899.
J. E. THEBAUD.
INDICATING AND RECORDING MECHANISM FOR MEASURING FLUIDS IN MOTORS, &c.
(Application filed Feb. 28, 1898.)
(No Model.) 5 Sheets—Sheet 3.

Witnesses
Inventor
JOHN EDWARD THEBAUD
By his Attorney

THE NORRIS PETERS CO., PHOTO-LITHO., WASHINGTON, D. C.

No. 619,632. Patented Feb. 14, 1899.
J. E. THEBAUD.
INDICATING AND RECORDING MECHANISM FOR MEASURING FLUIDS IN MOTORS, &c.
(Application filed Feb. 28, 1898.)
(No Model.) 5 Sheets—Sheet 4.

Witnesses
Inventor
JOHN EDWARD THEBAUD.
By his Attorney

No. 619,632. Patented Feb. 14, 1899.
J. E. THEBAUD.
INDICATING AND RECORDING MECHANISM FOR MEASURING FLUIDS IN MOTORS, &c.
(Application filed Feb. 28, 1898.)
(No Model.) 5 Sheets—Sheet 5.

Witnesses
Inventor
JOHN EDWARD THEBAUD
By his Attorney

UNITED STATES PATENT OFFICE.

JOHN EDWARD THEBAUD, OF BUFFALO, NEW YORK.

INDICATING AND RECORDING MECHANISM FOR MEASURING FLUIDS IN MOTORS, &c.

SPECIFICATION forming part of Letters Patent No. 619,632, dated February 14, 1899.

Application filed February 28, 1898. Serial No. 672,025. (No model.)

*To all whom it may concern:*

Be it known that I, JOHN EDWARD THEBAUD, a citizen of the United States, residing at Buffalo, in the county of Erie and State of New York, have invented certain new and useful Improvements in Indicating and Recording Mechanism for the Measurement of Fluids in Motors; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to improvements in indicating and recording mechanism for conduits or motors.

The object of my invention is to provide an automatic apparatus for indicating or recording either the flow of fluids through conduits or motors or the power generated thereby.

To that end my invention consists, broadly, of a cam the operative surface of which is generated by a curve or curves the ordinates of which represent to scale the results of tests or computations made upon the conduit or motor for quantities of discharge or power, a rider provided with an indicating-point used to denote upon a fixed scale or chronographic sheet the quantity of discharge or power and having a bearing contact with the operative surface of the cam, and intervening mechanism between the cam and the conduit or motor for giving such cam separate movements for changes in the two factors which govern the magnitude of the ordinates of the cam.

My invention further consists in combining with the above construction an auxiliary cam the operative surface of which is generated by a curve or curves the ordinates of which represent the fractions or percentages that the ordinates, as indicated upon a fixed scale or chronographic sheet, are of the respective ordinates of the main cam, mechanism for operating such auxiliary cam in conjunction with the main cam, and intervening mechanism between the auxiliary cam and conduit or motor, each cam having a separate rider and both riders being connected by a system of levers which operate a common indicator for indicating on a scale or for tracing upon a chronograph-sheet a resultant reading.

My invention further consists of certain details of construction, all of which will be fully hereinafter described and claimed.

In the drawings, Fig. 5 is a diagrammatic view of my improved apparatus, head and tail races, penstock, water-wheel, and connections. Fig. 6 is a face view of a cam, illustrating method of generation. Fig. 7 is a side view of Fig. 6. Fig. 7$^a$ is a side view of a cam, illustrating method of giving thickness to a single plane curve. Fig. 14 illustrates the application of the transmitter to a float. Fig. 15 shows a modified form of transmitter. Fig. 16 shows a pressure device adapted to operate with the modified transmitter. Fig. 17 shows a pressure device connected with a Pitot tube and adapted to operate with the modified transmitter. Fig. 18 shows a speed device adapted to operate with the modified transmitter, and Fig. 19 shows a metallic thermometer adapted to operate with the modified transmitter.

Referring to the drawings, 1 is the main shaft, its outer end being suitably supported in the outer portion 2 of the main frame.

3 is an annular journal supported in the intermediate portion 4 of the main frame, the shaft 1 being supported in such journal as a bearing for its inner portion. To the inner end of shaft 1 is rigidly secured the ring 5, carrying the integral yoke 6, in which is loosely pivoted the pinion 7.

8 8' are two rack-bars, having the two rows of teeth 9 and 10 on horizontally opposite sides thereof. The rack-bars 8 8' have upper and lower grooves 11 and 12, adapted for sliding engagement with the tongues 13 and 14 in the upper and lower sections 15 and 16 of the carrying-frame. 17 and 18 are open frames secured in the front and back of the main frame and to which the sections 15 and 16 of the carrying-frame are secured by the upper and lower central extensions 19 and 20, integral with the carrying-frame. In the frames 17 and 18 are secured the two sets of double magnets 21 22 and 23 24.

Pivoted to the central extensions 19 and 20 and adjacent to the two opposite sets of magnets are the actuating-levers 26 and 27.

Referring to lever 27, it is seen to be composed of the two right-angled arms 28 and 29 and the central tripping-arm 30. The outer ends of the arms 28 and 29 are provided with open longitudinal slots 31 and 32. In the open ends of these slots 31 and 32 are pivoted the pawls 33 and 34. Leaf-springs 35 and 36 are secured on the arms 28 and 29 and extend down to and in contact with the pawls 33 and 34.

33' and 34' are pins for engagement with the pawls 33 and 34 to hold them in normal spring-pressed position.

37 and 38 are two armatures integral with the lever 27 and arranged thereon at a slight angle for operation with the cores 39 and 40 of the magnets in operating the lever.

41 is a leaf-spring, one end of which is centrally embedded in the lever 27, its other working loosely in the socket 42 in the open frame 18. The outer end of the tripping-arm 30 is slotted for the pivoted reception of the angular tripping-levers 43 and 44. The inner ends of these tripping-levers are held in normal position against the pins 45 and 46 by the leaf-springs 47 and 48. The locking-levers 49 and 50 are pivoted in the carrying-frame 15 16, their inner pointed ends being adapted for engagement with the outer teeth of the rack-bar 8' and their outer ends being adapted for contact with the tripping-levers 43 and 44. The spiral spring 51, connecting the outer ends of these levers, serves to hold them in locking engagement with the rack-bar 8'.

The lever 26 on the opposite side is similarly provided with spring-pawls 52 and 53, armatures 54 and 55, and tripping-levers 56 and 57, which act in conjunction with the locking-levers 58 and 59, pivoted in the carrying-frame 15 16. The armatures 54 and 55 on the lever 26 are operated by the cores 60 and 61 of the magnets 21 and 22.

The large gear-wheel 62 is loosely mounted upon the annular journal 3 for rotation thereon and is secured in such position by the disk 63, keyed upon the shaft 1 and secured by screws to the annular journal 3.

The disk 64, loosely mounted on the shaft 1, is provided upon its inner face with the integral concentric ring 65, forming a socket for the reception of one end of the tubular hub 66, its other end resting removably in a similar socket 67 on the smaller disk 68, which loosely encircles the shaft 1. The end of the hub 66 which rests in the socket 67 of disk 68 is provided with the filling-ring 69, rigidly secured therein and adapted for the reception of screws passing through the disk 68 for removably securing the same thereto.

Collars 70 and 71, rigidly secured to shaft 1 outside of the disks 68 and 64, prevent lateral movement of these disks and interposed hub 66 upon the shaft.

I have preferably shown my improved apparatus for conduits or motors as applied to a hydraulic-power plant.

Figures 4, 11, 12, 13:
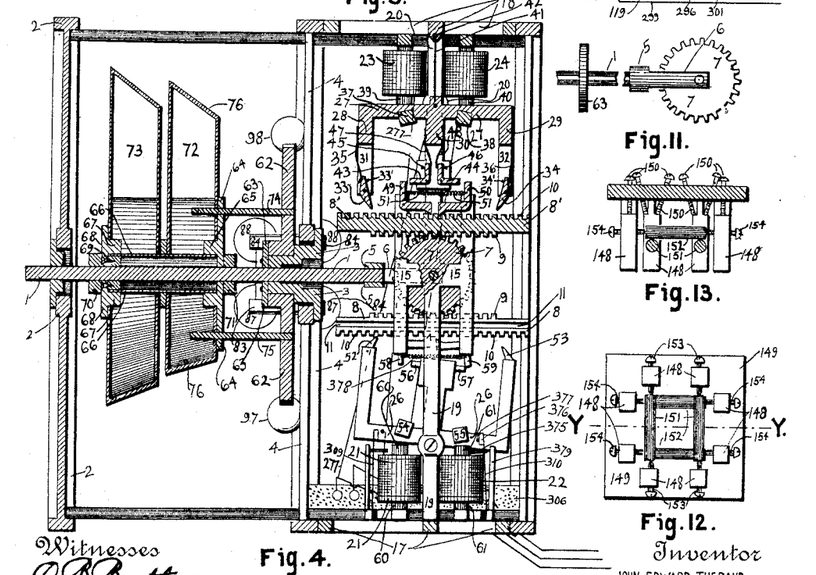
Fig. 4 is a horizontal section in the line $x$ $x$ of Fig. 2.
Fig. 11 is a detached detail of pinion shown in Fig. 4.
Fig. 12 is a detached under side view of the antifriction-socket for the rider.
Fig. 13 is a vertical section of Fig. 12, taken in line $y$ $y$.

72 and 73 are two hollow cams removably mounted upon the hub 66 and the outer annular surfaces of the sockets 65 and 67 of the disks 64 and 68, as shown in section in Fig. 4.

Upon the gear-wheel 62 are secured the rods 74 and 75, which pass loosely through apertures in the disk 64 and contiguous wall of the cam 72 to impart to the cams the rotary motion of the gear-wheel 62 without preventing the lateral motion of the same.

The operative surface 76 of the cam 72 is generated in accordance with results of tests or computations made upon the water-wheel for discharge at different heads and the various openings of the wheel-gate. Explaining this matter in a general way, let us suppose that for a given head $h'$ we find by testing that we have for the different angular openings of the wheel-gate $A'$ $A^2$, &c., the respective quantities of discharge $Q'$ $Q^2$, &c. Then for this constant head $h'$ we may plot a plane curve (see Fig. 6) using the quantities as polar coördinates, but referring the lengths of the radii-vector to the circumference of a circle $x$ instead of to the pole $o$, which is the center of the circle $x$. This method of using the circle $x$ is employed for the purpose of giving the cam a better operative surface, and thereby permitting it to be mounted upon the shaft 1, upon which it has a motion of rotation. Let $a$ be the radius of the circle $x$ above referred to. Then plotting $Q'$ to scale on the radius-vector $o\ b$, making an angle $A'$ with the line of reference $o\ c$, then $Q'$ being plotted from the circumference of the circle $x$ we find the point $b$. In a similar manner for the angle $A^2$ and the quantity $Q^2$ we find a point $d$. Other points of the curve are similarly found. We have thus generated a plane curve for the given head $h'$. For any other head than $h'$ the quantities $Q'$ $Q^2$, &c., are found to be different for the same angular openings $A'$ $A^2$, &c., of the wheel-gate. Therefore plotting a separate curve for each different head—say, every consecutive foot between two limits—we shall have a series of plane curves which may be equally spaced upon a shaft, the plane of each curve being perpendicular to the shaft and the curves so set that their lines of reference, as $o\ c$, Fig. 6, of the curves shall all fall in one plane which passes through the axis of the shaft. The surface generated by these curves of head forms the operative surface 76 of the cam 72, as shown in Figs. 1, 2, 4, 5, and 6.

The cam 73 is rigid with the cam 72, as shown in Fig. 4. While both are free to rotate upon the shaft 1, they partake of the motion of translation of the shaft 1 by means of the collars 70 and 71.

The operative surface of the cam 73 is generated similarly to cam 72, with the exception that the radii vectores represent to scale the results of tests or computations for power instead of discharge, as with cam 72.

77 is an actuating-lever (see Fig. 2) similar to lever 26 already described and adapted for operative engagement with the teeth of the large gear-wheel 62. This lever has the two right-angled arms 78 and 79 and the central tripping-arm 80. The outer ends of the arms 78 and 79 are provided with the spring-pressed pawls 81 and 82. Two armatures 83 and 84 are arranged upon the lever 77 integral therewith and at a slight angle for operation with the cores 85 and 86 of the two sets of magnets 87 and 88, secured in the frame 89, attached to the main frame. The outer end of the tripping-arm 80 is provided with the tripping-levers 90 and 91. The locking-levers 92 and 93, pivoted in the frame 89, have their pointed ends adapted for locking engagement with the teeth of the gear-wheel 62 and their other ends adapted for engagement with the tripping-levers 90 and 91. The spiral spring 94, connecting the outer ends of these levers, serves to hold them in locking engagement with the gear-wheel 62.

95 and 96 are two rigid arms extending down obliquely from the lever 77, having at their outer ends the integral weights 97 and 98, their object being to lower the center of gravity of the lever 77 below its pivot-point.

99 and 100 are two vertical leaf-springs embedded at their lower ends in the sockets 101 and 102, of non-conducting material. Their upper ends are provided with blocks 103 and 104, adapted for contact with the pins 105 and 106 on the lever 77. The springs 99 and 100 carry the rigid armatures 107 and 108, located below the blocks 103 and 104, and are adapted for operation with the cores 85 and 86 of the magnets 87 and 88. Vertical arms 109 and 110, secured to the insulating material 101 and 102, extend up to the armatures 107 and 108 and against which these armatures normally rest, their object being to deaden the vibration of the armatures when released from the influence of the cores 85 and 86. The same system of leaf-springs, blocks, armatures, &c., is employed with all the other sets of magnets.

111 is a gear-wheel mounted on the shaft 112, which is journaled in the hanger 113, extending down from the main frame. This gear-wheel 111 intermeshes with the large gear-wheel 62. Mounted on the shaft 112, on the opposite side of the hanger 113, is the pinion 114, which intermeshes with the gear-wheel 115, mounted on the shaft 116, which is journaled in the hangers 113 and 117. The small pinion 118 is also mounted on the same shaft 116.

The long shaft 119 is supported by the journal 120 on the main frame and by the journal 125, also mounted upon the main frame. The central portion of this shaft has formed upon it the series of annular ribs 121, forming a rack for engagement with the small pinion 118 for giving to shaft 119 a motion of translation without interfering with its revolution.

122 and 123 are auxiliary cams to be employed in the absence of a governor and rigidly mounted on the shaft 119 and on each side of the rack 121. The operative surfaces of these cams are generated by a series of curves the radii vectores of which represent percentages of results, which results are due to variations in head and opening of the wheel-gate. These percentages are due to changes in the speed of the water-wheel.

The cam 122 is used in conjunction with the cam 72, both being for discharge.

The cam 123 is used in conjunction with the cam 73, both being for power.

124 is a large gear-wheel loosely mounted on a journal 125, secured to the main frame and through which the shaft 119 passes.

126 126 are two rods rigidly secured to the gear-wheel 124 and at right angles to the plane of the same. These rods 126 are loosely engaged in apertures in the side wall of the cam 123 to impart to the two cams 123 and 122 and their common shaft 119 the rotary motion of the gear-wheel 124.

In the small frame 127 are mounted the two sets of magnets 128 and 129, (see Fig. 1,) provided with the cores 130 and 131. An actuating-lever 132 is pivoted in the frame 127 on the pointed screws 128' 128'. (See Fig. 3.) This lever is similar to lever 26, already described, and is adapted for operative engagement with the teeth of the large gear-wheel 124. This lever has the two right-angled arms 133 and 134 and the central tripping-arm 135. The outer ends of the arms 133 and 134 are provided with the spring-pressed pawls 136 and 137 for engagement with the teeth of the gear-wheel 124. Two armatures 138 and 139 are arranged upon the lever 132 integral therewith and at a slight angle for operation with the cores 130 and 131 of the two sets of magnets 128 and 129. The outer end of the tripping-arm 135 is provided with tripping-levers 140 and 141. The locking-levers 142 and 143 have their pointed ends adapted for locking engagement with the teeth of the gear-wheel 124 and their other ends adapted for engagement with the tripping-levers 140 and 141. The spiral spring 144, connecting the outer ends of these levers, serves to hold them in locking engagement with the gear-wheel 124.

145 is a vertical rider, its lower end resting upon the operative surface 76 of the cam 72, the contacting end being shod with a material softer than the operative surface of the cam to prevent scratching or abrading the same. This rider 145 passes up through two antifriction-sockets 146 and 147 in the framework, one of which sockets being shown in detail in Figs. 12 and 13. Posts 148, eight in number, depend from the lower side of the plate 149, their upper ends being webbed to impart flexibility to the same and provided with shoulders for the adjusting-screws 150. Two sets of rollers 151 151 and 152 152 are journaled in the ends of the pointed screws 153 and 154, which pass through the posts 148 in tight screw-threaded engagement. These rollers form a rectangular antifriction-opening through which the rider reciprocates in operation, the adjusting-screws 150 being employed to regulate the contact of the rollers with the moving rider 145. Another similar vertical rider 155 is provided for the cam 73 and moves in sockets 156 157 similar to those just described. 158 is a horizontal rider reciprocating in antifriction-sockets and is similar in form to riders 145 and 155 and has permanent contact with the operative surface of the cam 122, being kept in such position by means of the counterweight 159, attached to one end of a cord 160, which passes over the pulley 161 and is secured at its other end to the rider 158 at the point 162. This rider 158 has the integral vertical arm 163, which passes loosely up through the socket 164. (See Figs. 2 and 3.) To this socket 164 is rigidly attached the horizontal socket 165, the short rod 166 connecting the two sockets. 167 is a horizontal rod (see Fig. 1) which passes loosely through the horizontal socket 165 and is provided with a vertical socket 168, through which the vertical guide-rod 169 passes. The outer end of the vertical socket 168 carries the horizontal leaf-spring 170, which carries the marker 171 for registering contact with a record-sheet 172, secured around the chronographic drum 173. The spring 170, carrying the marker 171, is adjustably pivoted to the horizontal rod 167 to enable the marker to be swung clear of the drum while placing a new record-sheet thereon.

174 is an arm secured to the rider 145 by the screw 175. The outer end of this arm 174 moves in a slot 176 in the inclined arm 177 of the lever 178, which is separated from such lever by the connecting-arm 179, thus providing an unobstructed passage for the socket 164 of the vertical arm 163 on the horizontal rider 158. The lever 178 extends diagonally downward and is provided at its lower end with a cross-arm 180, the outer ends of which are provided with the upwardly-inclined extensions 181 and 182.

Figure 1:
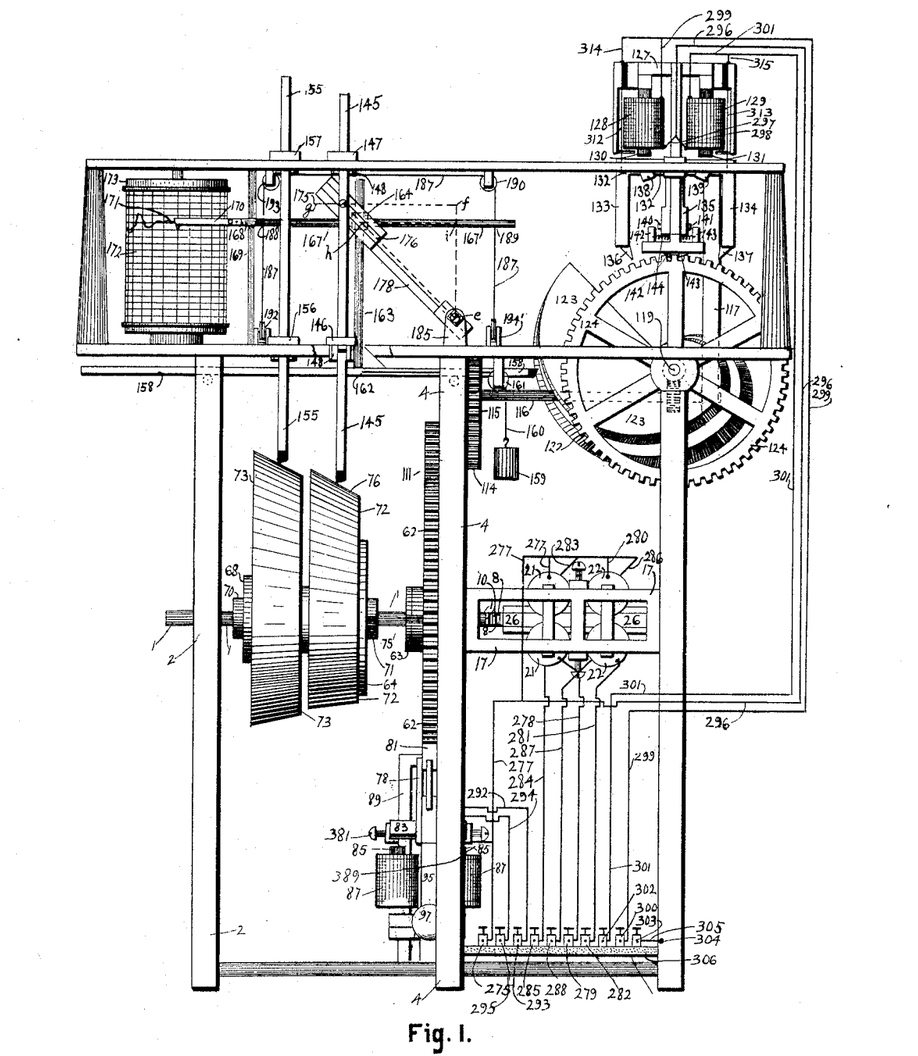
Figure 1 is a front elevation.
Figure 2:
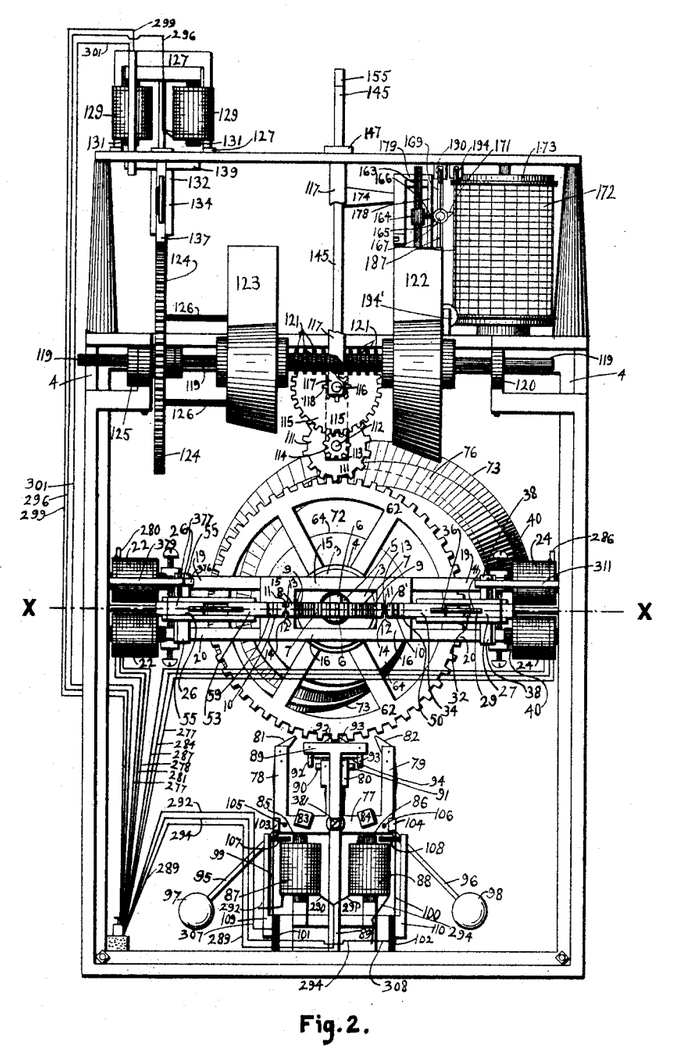
Fig. 2 is a side elevation.
Figure 3:
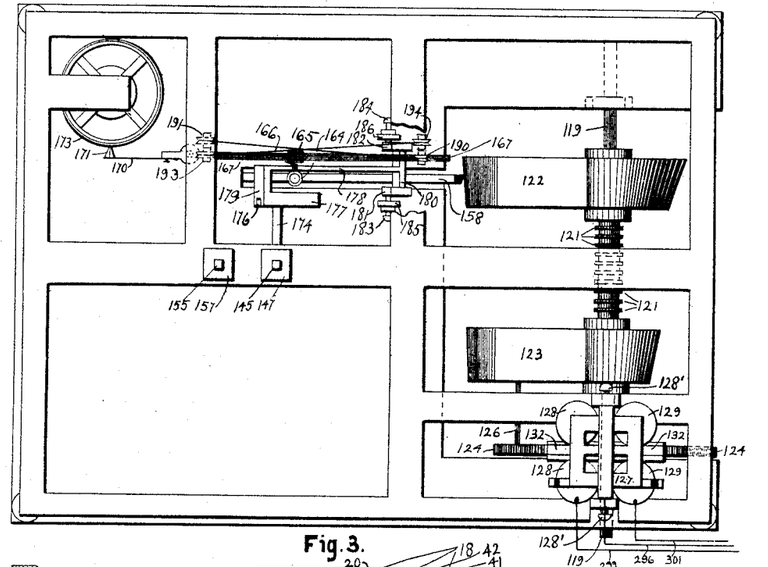
Fig. 3 is a top plan view, of my improved apparatus.

183 and 184 are screw-pins in tight adjustable engagement with the posts 185 and 186, their inner pointed ends having pivotal engagement with the extensions 181 and 182 on the lever 178. The short rod 166, connecting the two sockets 164 and 165, has bearing contact with the upper surface of the inclined lever 178, as shown in Figs. 2 and 3.

To preserve the horizontality of the rod 167, carrying the marker 171, I have provided the endless cord 187, which is arranged as follows: This cord 187 passes through and is secured to the rod 167 at the points 188 and 189. Commencing at the point 189 the cord passes up and over the pulley 190, thence horizontally across to and over the pulley 191, thence down behind rod 167 to and around the pulley 192, thence up to the point 188 on the rod 167, where it is secured. From this point 188 it further extends up and over the pulley 193, from which it is carried along to and over the pulley 194, thence down to and around the pulley 194', and thence up to the point of beginning, 189, on the rod 167.

Figures 8, 9, 10:
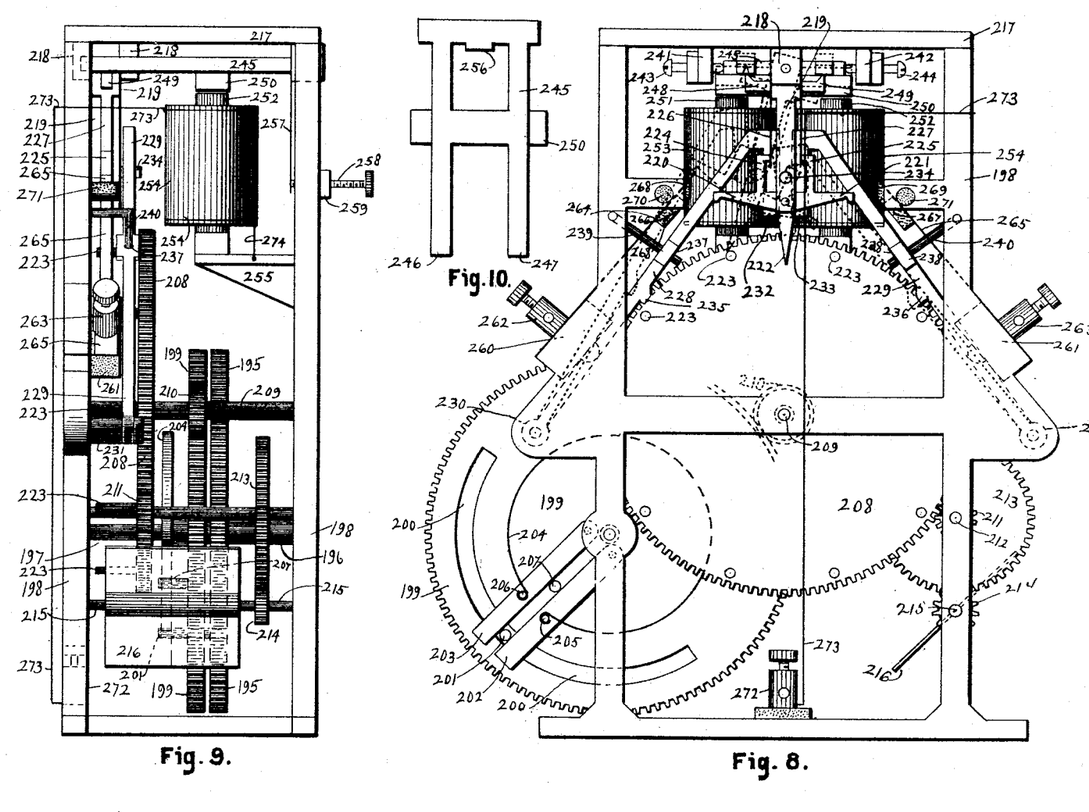
Fig. 8 is a front elevation of my improved transmitter.
Fig. 9 is a side elevation of Fig. 8.
Fig. 10 is a detached detail view of the horizontal lever of the transmitter.

Figs. 8, 9, and 10 illustrate my improved form of transmitter which is employed to operate the indicating and recording mechanism above described. In such transmitter 195 (see Fig. 9) is a gear-wheel rigidly mounted on the short hollow shaft 196, which revolves upon the longer solid shaft 197, which is journaled in the frame 198. This gear-wheel 195 is intended to intermesh with a pinion on a shaft the varying rotary motions of which are to be transmitted to the receiver of the indicating and recording mechanism. Another gear-wheel 199 is mounted rigidly on the solid shaft 197 and just in front of the first gear-wheel 195. The gear-wheel 199 has the concentric slot 200, extending partially around the same and near its outer periphery. The pin 201, rigid upon the gear-wheel 195, projects through the concentric slot 200. Two arms 202 and 203 are pivoted upon the outer face of the gear-wheel 199, near its center, and move in the plane of the wheel.

204 is a circular spring having its ends secured to the pins 205 and 206 on the arms 202 and 203 and serve to keep these arms normally against the pin 207, rigid with the outer face of the gear-wheel 199. These arms 202 and 203 also lie normally against the pin 201 in the slot 200 and serve to keep it in the same radial line with the pin 207. The gear-wheel 208 is mounted upon the shaft 209 and is provided near its periphery and upon its outer face with a series of rigid pins 223 at equal intervals apart. Upon the shaft 209 is also rigidly mounted the pinion 210, which intermeshes with the gear-wheel 199. The gear-wheel 208 in turn intermeshes with the pinion 211, rigid upon the shaft 212, which carries near its other end the gear-wheel 213, which in turn intermeshes with the pinion 214, rigid upon the shaft 215. Upon this shaft is mounted the fly 216.

Depending from the top plate 217 of the transmitter-frame is the central hanger 218, in which is pivoted the upper end of the movable arm 219. In the lower end of this arm is loosely journaled the metallic T-piece, consisting of the two contacting arms 220 and 221 and the central pointed lever 222, which extends partially below the line of pins 223 upon the gear-wheel 208. Two posts 224 and 225 extend vertically upward from the contacting arms, their upper ends being turned inwardly to receive the bearing contact of the lower ends of the two retaining-springs 226 and 227, which are secured on each side of the pivoted rod 219.

228 and 229 are two locking-arms, pivoted at their lower ends to the posts 230 and 231. These locking-arms are inclined inwardly toward the pivoted rod 219 and are provided with the downwardly-extending arms 232 and 233, which rest normally against opposite sides of the pin 234, rigid with the movable arm 219.

235 and 236 are lugs located on the under sides of the locking-arms 228 and 229 about midway of their length and adapted for engagement with the pins 223 on the gear-wheel 208. Two sockets 237 and 238 are made in the locking-arms 228 and 229, adapted for the sliding reception of the guide-pins 239 and 240, which serve to retain the movements of the locking-arms in a vertical plane and insure their resting contact with the pin 234. Two hangers 241 and 242 are located on the under side of the plate 217. In engagement with these hangers are the two pointed screws 243 and 244, from which is pivoted the lever 245, the form of which is clearly shown in Fig. 10. The outer ends 246 and 247 of the lever 245 rest normally upon the horns 248 and 249, integral with the pivoted rods 219 and on opposite sides of the same. 250 is an armature extending across the under side of the lever 245, adapted for operation with the cores 251 and 252 of the double magnet 253 and 254, resting upon the bracket 255 on the frame. To the inner projection 256 of the lever 245 is rigidly secured the leaf-spring 257, which extends downwardly for regulating contact with the screw 258 in the frame, which may be locked in position by the nut 259. 260 and 261 are insulating-seats for the binding-posts 262 and 263. Between the binding-posts 262 and 263 and the insulating-seats 260 and 261 are secured the flat contact springs or pieces 264 and 265. The outer ends of these springs are provided with integral wings 266 and 267, which secure the insulating-blocks 268 and 269 to the contact-springs 264 and 265. The outer ends of these springs rest normally against the insulating-pins 270 and 271. Insulated upon the bedplate of the frame is the binding-post 272, which is connected by the wire 273 to the double magnet 253 and 254, the magnet being connected to the frame by wire 274.

The wiring of the indicating and recording mechanism for connection with the transmitter is arranged as follows: The binding-post 275, (see Fig. 1,) connected to the generator 276, (see Fig. 5,) has attached to it the wire 277, which leads to the double magnet 21. The wire 278 connects the double magnet 21 with the binding-post 279. A branch 280 of the wire 277 is connected with the double magnet 22. The wire 281 connects the double magnet 22 with the binding-post 282. Another branch 283 of the same wire 277 is connected with the double magnet 23, and the wire 284 connects the double magnet 23 with the binding-post 285. Another branch 286 of the same wire 277 is connected with the double magnet 24, and the wire 287 connects the double magnet 24 with the binding-post 288. Another branch 289 of the same wire 277 is connected with both double magnets 87 and 88 by the auxiliary branches 290 and 291 (see Fig. 2) of the branch wire 289. The wire 292 connects the magnet 87 with the binding-post 293, and the wire 294 connects the other magnet 88 with the binding-post 295. Another branch 296 of the wire 277 is connected with both magnets 128 and 129 at the top of the frame through the auxiliary branches 297 and 298 of the wire 296. The wire 299 connects the magnet 128 with the binding-post 300, and the wire 301 connects the other magnet 129 with the binding-post 302. The binding-post 303 is connected with the frame at the point 304 by the wire 305 and with the generator 276. The binding-posts 275, 295, 293, 285, 288, 279, 282, 302, 300, and 303 are all mounted upon a common insulating-strip 306. The wire 307, leading from the spring 99, (see Fig. 2,) connects with the wire 292, thus forming an electric connection of the leaf-spring 99 with the magnet 87. The wire 308, leading from the leaf-spring 100, connects with the wire 294, thus forming an electric connection of the leaf-spring 100 with the magnet 88. In a similar manner the leaf-springs 309 and 310, which are insulated on the carrying-frame 19, (see Fig. 4,) are connected with the wires 278 and 281, thus forming an electric connection between these leaf-springs and the magnets 21 and 22. Two leaf-springs, similar to those just described, are employed with the magnets 23 and 24, one of such leaf-springs being behind the post shown at 311, Fig. 2, and are connected in a similar manner to their respective magnets through their connection with the wires 284 and 287. Again, in a similar manner the leaf-springs 312 and 313 are employed with the magnets 128 and 129 and are connected to their respective magnets through their connections 314 and 315 with the wires 299 and 301.

Figures 5, 6, 7, 7A, 14, 15, 16, 17, 18, 19:
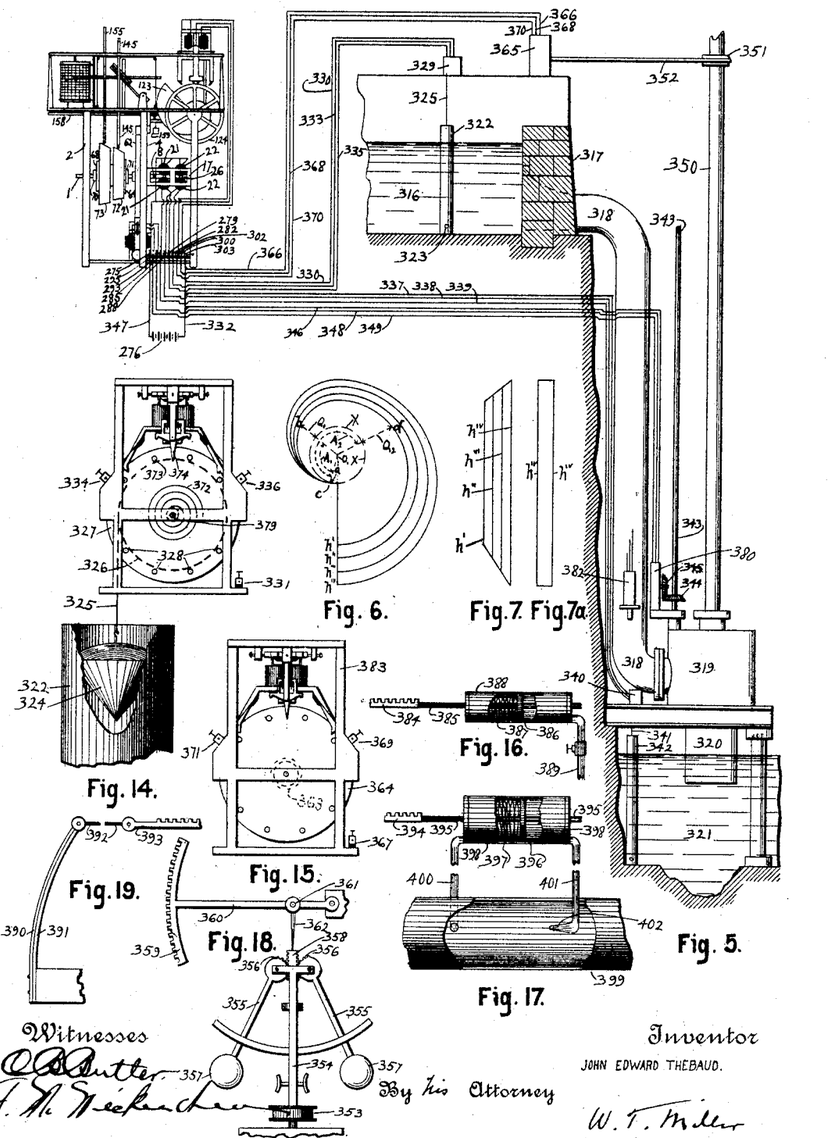

Referring to Fig. 5, 316 is the head-race, 317 the retaining-wall, 318 the pen-stock, 319 the water-wheel casing, 320 the draft-tube, and 321 the tail-race, of the hydraulic plant with which I have shown by way of illustration one application of my improved indicating and recording apparatus.

322 is a tubular casing (see also Fig. 14) secured in an upright position in the head-race 316. The casing is open at the top and provided with an inlet-orifice 323 at its lower closed end to regulate the rate of flow of the water in and out of the casing. On the surface of the water in the casing 322 rests the conical float 324, to which is attached the cord 325, which passes over and is wound around a drum 326. (Shown in dotted lines in Fig. 14.) This drum 326 is rigid with a disk 327, carrying the series of pins 328. This disk and drum are substituted for the gear-wheel 208 in the transmitter shown in Figs. 8 and 9. The mechanism in the transmitter shown in Fig. 14 is identical with that shown above the gear-wheel 208 in Figs. 8 and 9, the mechanism below such gear-wheel 208 being in this instance omitted. 329 is a casing containing the form of transmitter shown in Fig. 14.

The wire 330, which is the common return-wire, is attached to the binding-post 331 on the transmitter and extends to the wire 332, connecting the generator 276 with the binding-post 303. The wire 347 connects the generator 276 with the binding-post 275. The wire 333 is attached to the binding-post 334 on the transmitter and extends to the binding-post 282. The wire 335 is attached to the binding-post 336 on the transmitter and extends to the binding-post 279. The three wires 337, 338, and 339 have their lower ends attached to the binding-posts of a similar transmitter inclosed in the casing 340, which transmitter is operated through the cord 341 by a float in the tubular casing 342 in the tailrace 321. The common return-wire 337 of the above series is connected with the generator-wire 332. The wire 338 is connected with the binding-post 288, and the wire 339 is connected to the binding-post 285.

The vertical rod 343 operates the wheel-gate (not shown) located in the casing 319. On this rod is the bevel-gear 344, which intermeshes with the bevel-gear 345, which operates the type of transmitter shown in Figs. 8 and 9. The common return-wire 346 is connected with the binding-post 272 on the transmitter and extends to the generator-wire 332. The wire 348 is connected with the binding-post 263 on the transmitter and extends to the binding-post 293. The wire 349 is connected with the binding-post 262 on the transmitter and extends to the binding-post 295.

350, Fig. 5, is the main shaft of the water-wheel. Upon this shaft is mounted the pulley 351, and 352 is a belt which connects the pulley 351 with the pulley 353. (See Fig. 18.) On this pulley 353 is mounted the frame 354, in which are pivoted the governor-arms 355 355, having the segmental teeth 356 356 at their upper ends and the balls 357 357 at their lower ends.

Between the segmental teeth 356 356 and intermeshing with the same is the rack-bar 358, adapted for vertical reciprocation within the frame 354. The segmental rack 359 is mounted on the pivoted arm 360 and has pivotally attached to it at the point 361 the bearing-pin 362, which rests upon the upper end of the rack-bar 358. The segmental rack 359 has operative engagement with the pinion 363 (shown in dotted lines) behind the disk 364 on the type of transmitter shown in Fig. 15, all of which is located in the casing 365. The common return-wire 366 is connected with the binding-post 367 on the transmitter shown in Fig. 15 and extends to the generator-wire 332. The wire 368 is connected with the binding-post 369 on the same transmitter and extends to the binding-post 300, and the wire 370 is connected with the binding-post 371 on the same transmitter and extends to the binding-post 302. This completes the wiring of the different operative parts of the entire apparatus, the operation of which is as follows:

Referring to Figs. 8 and 9 for a detailed description of the operation of the transmitter, the series of pins 223 mounted on the gear-wheel 208 are rotated in either direction through means to be fully described hereinafter. As one of the pins 223 strikes the lever 222 on the T-piece it swings the upper end of the left-hand post 224 of the contacting arm 220 in toward the movable arm 219 against the action of the leaf-spring 226, at the same time raising the engaging end of the contacting arm 220. The movable arm 219, to which the T-piece is pivoted, is next caused to swing to the left, at the same time moving the attached horn 248 up in contact with the side arm 246 of the lever 245 and lifting the same. The side movement of the movable arm 219 to the left permits the locking-arm 229 to fall into a position for the engagement of the lug 236 with one of the pins 223. The changed position of parts just described is indicated in dotted lines in Fig. 8. As the pin 223 in engagement with the lever 222 moves away from contact with the same one of the pins 223 is locked against further movement by the lug 236. At the same time the leaf-spring 226 throws out the post 224, causing the contacting arm 220 to descend in engagement with the end of the spring 264, thus completing the circuit from the binding-post 262 through the spring 264 into the contacting arm 220, then through the arm 219 into the frame, then through connecting-wire 274 (see Fig. 9) into the magnet 254, thence through wire 273 to the binding-post 272, and back through the external circuit and the generator to the binding-post 262. The magnet 254 thus being energized draws down its armature 250 and attached lever 245, causing the arm 246 of this lever to depress the horn 248 and throw the contacting arm 220 out of engagement with the spring 264, thus breaking the circuit and restoring all of the operative parts to their normal position, as shown in full lines in Fig. 8, in which position the locking-arm 229 is now out of engagement with its pin 223. It will readily be seen from the operation just described that no engagement of the contacting arm 220 with the spring 264 to complete the circuit can possibly occur until the pin 223 has escaped contact with the lever 222, so that it will be necessary for the gear-wheel 208 to move more than the angular distance between two consecutive pins in order to complete the circuit. The positive movement of the pins 223 will operate to cause an impulse to be sent through the binding-post 263 in a manner similar to that just described for the binding-post 262, the circuit thus completed returning through the common return binding-post 272. To the inner central projection 256 of the lever 245 (see Figs. 9 and 10) is rigidly secured the leaf-spring 257, the lower end of which has bearing contact with the adjusting-screw 258 for the purpose of adjusting the gravity-pressure of the lever 245 upon the horns 248. This pressure can be entirely removed from the horns if necessary and yet not interfere with the operation of the double magnet.

Referring now to cam 72, when the water in the head-race 316 rises the float 324, resting upon its surface, has imparted to it an upward movement, which permits the coiled spring 272, which is secured to the drum-shaft and to the frame of the transmitter, to give to the drum 326 and its attached disk 327 a positive rotation as slack is given to the cord 325, attached to the rising float 324. The particular pin 373 being one of the series of pins 328 comes in contact with the lever 374 and by its further movement, as already described in connection with Figs. 8 and 9, completes the circuit through the transmitter and the binding-post 336 and through the wire 333 to the binding-post 282 on the indicating and recording apparatus, (see Fig. 1,) thence through the wire 281 to the magnet 22, then through this magnet to the wire 280, then to the wire 277 and to the binding-post 275, thence along wire 347 to the generator 276, then along the wire 332 into the line-wire 330 and back to the binding-post 331 on the transmitter, thus completing the circuit through such transmitter. When such circuit is completed through magnet 22, (see Fig. 4,) the armature 375 is attracted to the core 61. The magnetic influence being too weak to draw the armature 55, a local circuit is automatically introduced by the contact of the block 376 with the pin 377 through the action of the armature 375. The circuit now acting through the magnet 22 is arranged as follows: Starting at the point of contact of the pin 377 with the block 376, the current passes into the leaf-spring 310, thence into a branch wire (not shown) of the wire 277 into the binding-post 275 through the wire 347 into the generator 276, thence through the wire 332 into the binding-post 303, thence through the short wire 305 into the frame and connections to the point of beginning 377. Pending the electric action just described the circuit through the transmitter forms a shunt until it is broken within the transmitter. The armature 55 having thus been attracted moves its attached lever 26 down to the position shown in Fig. 4, causing the spring-pawl 52 to engage with one of the teeth 10 of the rack-bar 8. In the beginning of the downward motion of the lever 26 the tripping-lever 57 disengages the locking-lever 59 from the rack-bar 8 to permit the pawl 52 to move said rack-bar 8 horizontally to the right. The tripping-lever 57 escapes past the end of locking-lever 59 at the proper instant to permit of one of the teeth 10 passing by the engaging end of the locking-lever 59 in order to engage with the next succeeding tooth to lock the same. The last action of the locking-lever 59 is accomplished through the tension of the spring 378. During the movement of the lever 26 the pin 377 escapes contact with the block 376, thereby breaking the circuit through the magnet 22. The lever 26 is next returned to its normal position by the action of a spring (not shown) similar to the spring 41 between the magnets 21 and 22. The block 376 on the spring 310 is returned to its normal position with its armature 375 against the post 379, when the circuit is broken through the magnet. The motion of translation thus given to the rack 8 is transmitted to the gear-wheel 7, which rolls on the rack 8', through their intermeshing teeth. The gear-wheel 7 imparts a motion of translation to the shaft 1, which is connected thereto by the yoke 6 and ring 5. The cam 72, being mounted on the shaft 1 between the rigid collars 70 and 71, moves with such shaft one-half the distance through which the rack 8 passes. The rider 145, in bearing contact with the operative surface 76 of such cam, is raised in its antifriction-sockets 146 and 147 as the cam is moved to the right in response to the raising of the float 324. As the float 324 falls the drum 326 and attached disk 327 are given a negative rotation against the action of the coiled spring 372. The action of the intervening mechanism between the disk 327 and the pawl 53 on the lever 26, including the magnet 21, will in a similar manner impart to the rack-bar 8 a motion of translation to the left, which has the effect of moving the cam 72 to the left, thus causing the rider 145 to be lowered in its antifriction-sockets in response to the dropping of the float 324. In response to the rising of the float in the tail-race an impulse is sent to the magnet 23 through the connections with the transmitter inclosed in the casing 340 as follows: Starting at the binding-post 285, (see Figs. 1 and 5,) the current passes through the line-wire 339, through the transmitter, and to and through the common return-wire 337 to the generator-wire 332, thence to and through the generator 276, into and through the wire 347, into the binding-post 275. It then passes through wire 277, to and through the wire 283, into and through the magnet 23, thence into the wire 284, back to the binding-post 285. The current just described energizes the magnet 23, which causes the pawl 34 to engage with and move the rack 8' to the left in a manner similar to that already described for the pawl 52. This action causes the cam 72 to move to the left, thereby lowering the rider 145 in response to the raising of the water in the tail-race. The raising of the water in the head-race increases the effect of head on the water-wheel. The raising of the water in the tail-race decreases the effect of head of the water on the water-wheel.

The lowering of the water in the head-race and the lowering of the water in the tail-race respectively decrease and increase the effect of head of the water on the water-wheel. For these reasons the cam 72 has been moved to the right by the raising of the water in the head-race or the falling of the water in the tail-race and has been moved to the left by the falling of the water in the head-race or the raising of the water in the tail-race. If, by chance, the vertical movements of the water in the head and tail races effect no change of head, the motion of one rack-bar will offset the other by their equal motions in contrary directions, thus causing the intervening gear-wheel 7 to rotate about a fixed point. Consequently the shaft 1 will have no motion of translation, and the cam 72 will constantly present to the shoe of the rider 145 the same curve of head. The cam 73, rigidly connected with the cam 72 on shaft 1, operates, in connection with the rider 155 for indicating and recording changes in the generated power of the water-wheel, in a similar manner to that heretofore described for cam 72 for responding to changes of head.

The motion of rotation of the cams 72 and 73 for variations in the opening and closing of the wheel-gate is effected in the following manner: As the rod 343 is turned to open the wheel-gate inclosed in the casing 319 the bevel-gears 344 and 345 communicate the rotation of the rod 343 to the gear 195 in the type of transmitter shown in Figs. 8 and 9. The operator in manipulating the wheel-gate rod is liable to open or close the wheel-gate in too sudden a manner for accurate effect upon the transmitter. This condition of affairs is especially apt to obtain where a governor is employed to operate the wheel-gate. To overcome this difficulty, I have found it necessary to provide a regulating device attached and operating with the transmitter, the parts of which have already been described in connection with Figs. 8 and 9. Their operation is substantially as follows: To retard a too sudden movement of the gear-wheel 208 with its attached pins 223, the rapid movement of the fly 216 is arrested by the resistance of the air. This retardation is communicated through the shaft 215 to the pinion 214, the gear-wheel 213, intermeshing with the pinion 214, the pinion 211, mounted on the shaft 212, and finally to the gear-wheel 208, intermeshing with pinion 211, thus producing the effect desired, that of giving to the gear-wheel 208 of the transmitter a uniform rotation. In order to harmonize the irregular motion of the gear-wheel 195, as received from the wheel-gate rod, (with which it is connected,) with the uniform motion of the gear-wheel 208, it will be seen that as the gear-wheel 195, loosely mounted on the shaft 197, revolves more rapidly than the gear-wheel 199 the pin 201, pressing against one of the arms 202 203, forces it away from the other arm and the interposed pin 207 against the action of the circular spring 204, thus causing the arm left in contact with the pin 207 to force the same by means of the pressure of the spring 204 to rotate the gear-wheel 199, to which the pin 207 is rigidly secured. The motion of the gear-wheel 199 thus given serves to operate the pinion 210, rigidly mounted on the same shaft with the gear-wheel 208 for the purpose of giving to the pins 223 their operative motion, and the gear-wheel 199 continues to rotate until the two pins 201 and 207 are again in the same radial line, as shown in Fig. 8. When the vertical rod 343 is turned to open the wheel-gate, an impulse is sent through the type of transmitter shown in Figs. 8 and 9, the operation of which has already been described. The circuit through the magnet 88 is thereby closed. This circuit may be traced as follows: Starting with the magnet 88 it passes through wire 294 to the binding-post 295, thence through the line-wire 349 to and through the transmitter located in the casing 380, thence back through the common return-wire 346, thence through the generator-wire 332 and generator 276 to and through the wire 347 to the binding-post 275, thence through the wire 277, to and through the wire 289, and into and through the branch wire 291 to the magnet 88. The core 86 of magnet 88 thus being energized attracts the armature 108, thus causing the block 104 to make contact with the pin 106 of the lever 77. This completes the local or stronger circuit through the magnet 88 by means of the following connections, through which the current consecutively passes, viz: the pin 106, the block 104, the leaf-spring 100, the wire 308, the wire 294, the magnet 88, the wire 291, the wire 289, the wire 277, the binding-post 275, the wire 347, the generator 276, the wire 332, the binding-post 303, the wire 305, the framework, and connections to the starting-point 106. The armature 84 on the lever 77 is drawn down by the core 86, causing the attached pawl 81 to engage with a tooth on the large gear-wheel 62. The operation of the tripping-lever 80 and its attached pawls 90 and 91 and the locking-levers 92 and 93 is identical with the operation of the similar parts operated by the magnet 22, as hereinbefore described. The impulse thus given to the gear-wheel 62 serves to rotate the cams 72 and 73 by means of the rods 74 and 75, rigid with the gear-wheel 62 and working loosely in sockets in the disk 64 and the contiguous side wall of the cam, giving to the cams a negative rotation. This movement of the cams lifts their respective riders in response to the increase of opening of the wheel-gate by presenting greater radii vectores to the contacting ends of the riders. A movement of the wheel-gate in closing will operate in a similar manner to rotate the cams 72 and 73 in the opposite direction, thus presenting smaller radii vectores to the contacting ends of the riders.

The changes in speed of the water-wheel have the effect of increasing or decreasing the results obtained with reference to head and opening of wheel-gate. It must therefore enter as a factor into the final results, as indicated or recorded upon the chronographic sheet. The apparatus provided for attaining this end operates as follows: The operative surface of the auxiliary cam 122 is generated by a series of curves in a manner similar to that used in generating the cams 72 and 73, as has been fully hereinbefore described, with the exception that the plane curves of generation instead of being plotted for the factor of head are plotted for the factor of wheel-gate opening, while the angle A instead of representing the opening of the wheel-gate, as it does in cams 72 and 73, represents in amount the quantity speed. The cams 122 and 123 are therefore given a motion of translation to bring the proper curve of wheel-gate opening under the rider and are rotated to present the proper radius vector within that curve corresponding to the particular speed to the rider, this radius vector being the fraction that the modified result, as indicated by the pen 171 upon the chronographic sheet, is of the result, as indicated by the point 175 on the rider 145. The standard ordinate of the auxiliary cam 122 is taken as a unit length, the radius vector just referred to being of the same fractional part of the standard ordinate that the modified result is of the result due only to the factors of head and opening of wheel-gate.

The cam 122 is generated to modify results of discharge and the cam 123 of generated power. The shaft 119, on which they are both rigidly mounted, has a motion of translation imparted to it by the action of the pinion 118 on the annular ribs 121 of the shaft 119. The pinion receives its rotary motion from the large gear-wheel 62 by means of the intervening gears 115, 114, and 111, as shown. These cams 122 and 123 are rotated by the large gear-wheel 124, which is loosely mounted on the journal 125, in which one end of the shaft 119 is loosely mounted, the rigid pins 126 126 on the gear-wheel 124 engaging with sockets in the side wall of cam 123 to give it a rotary motion without affecting its motion of translation. The gear-wheel 124 is rotated as follows: As the speed of the water-wheel shaft 350 varies it causes such variation to be transmitted to the bearing-pin 362 (see Fig. 18) by means of the rotating apparatus below this bearing-pin 362 through the medium of the belt 352, which connects the pulley 351 on the shaft 350 with pulley 353 in the rotating apparatus. The segmental rack 359 on the pivoted arm 360 partakes of the vertical motion of the bearing-pin 362 and imparts such motion to the disk 364 of the type of transmitter shown in Fig. 15 through the intermeshing of the pinion 363 with the segmental rack 359, all inclosed in the casing 365. (See Fig. 5.) A variation of speed of the shaft 350 causes an impulse to be sent by the action of the transmitter and attached mechanism, as just described, to the magnet 128 through a circuit arranged as follows: Starting with the magnet 128, it passes successively through the following connections, viz: the wire 297, the wire 296, the wire 277, the binding-post 275, the wire 347, (see Fig. 5,) the generator 276, the wire 332, the wire 366, the transmitter within the casing 365, the wire 368, the binding-post 300, the wire 299 back to the magnet 128. A local and stronger circuit is next introduced and operates in a manner similar to that described for the other magnets and with identical operative parts, as clearly shown in Fig. 1. The core of magnet 128, being thus energized, attracts the armature 138 on the lever 132, causing the spring-pawl 137 to operate upon the gear-wheel 124. The operation of the tripping-lever 135 and its attached pawls 140 and 141 and the locking-levers 142 and 143 is identical with the operation of the magnet 22, as hereinbefore described. The impulse thus given to the gear-wheel 124 serves to rotate the cams 122 and 123 through the rods 126, as already described. The negative rotation of the cam 122 forces the rider 158 to the left against the action of the attached counterweight 159 and in response to the change of speed of the water-wheel by presenting a greater radius vector to the contacting end of the rider 158. A contrary change in speed of the water-wheel will operate in a similar manner to rotate the cams 122 in the opposite direction and present a smaller radius vector to the contacting end of the rider. This gives to the rider a motion to the right through the action of its attached counterweight 159. The vertical movement of the rider 145 and the horizontal movement of the rider 158 cause a resultant vertical movement of the horizontal rod 167 in the following manner: As the rider 145 is moved upwardly by the action of the cam 72 it tends to swing the pivoted lever 178 by means of the connecting-arm 174, riding in the groove 176. This upward swing of lever 178 raises the small rod 166, resting thereon and connecting the two sockets 164 and 165, which serves to lift the horizontal rod 167 and its attached marker 171. A downward movement of the rider 145 serves to lower the horizontal rod 167 and its attached marker 171. A movement of the horizontal rider 168 to the left results in an upward movement of the horizontal rod 167 through the upward sliding of the connecting-rod 166 on the inclined lever 178. A movement of the rider 158 to the right results in a downward movement of the horizontal rod 167 and its attached marker through the downward sliding of the rod 166 on the inclined lever 178. The position of the vertical rod 163, rigid upon the rider 158, determines the fraction that the ordinate indicated by the marker 171 is of the radius-vector underneath the point of the rider 145 for the following reasons: The horizontal distance of the pivot $e$ from the vertical rider 145 may be considered as the length of one side of a triangle, this distance being represented by the line marked $fg$. The distance of the vertical rod 163 from the pivot $e$ is equal to the length of the line $hi$. The vertical dotted line $fe$ is equal in length to the radius-vector under the point of the rider 145, and the dotted line $ie$ is equal in length to the ordinate indicated by the marker 171 on the chronographic sheet. The point $e$ and the angle $hei$ being common to both triangles $hei$ and $gef$ and the lines $hi$ and $gf$ being parallel, the triangles are similar and their homologous sides are proportional. Hence we have the following relation: $fg:fe::ih:ie$, whence $fg \times ie = ih \times fe$, $fg$ being unity—that is, equal in length to the standard ordinate of the cam 122—and $fe$ equal to the quantity Q, represented by the ordinate under the rider 145, and $ie$ being equal to the modified result Q', and $ih$ being equal to the percentage $p$ that the ordinate under the rider 158 is of the standard ordinate. We have by substitution $1 \times Q' = p \times Q$ or $Q' = pQ$, which was to be demonstrated.

The transmitter in casing 329 and the float 324, which operates it, can be replaced by a pressure-gage, one form of which is shown in Fig. 16, and a transmitter attached thereto, both being located in the casing 382, attached to and communicating with the penstock 318.

The auxiliary cams 122 and 123 and their operating mechanism, together with the compound system of levers to produce a resultant reading upon the chronographic sheet, can be dispensed with in case the speed of the waterwheel is maintained constant by the use of a governor. In this event the vertical rider is simply provided with an arm carrying a marker to register upon the chronographic sheet. In case the level of the water in the tail-race is practically constant, or so slight in its changes as to produce an inappreciable effect upon the transmitter, then that part of the indicating and recording apparatus which is operated by the transmitter in question may be dispensed with, in which case the remaining operating rack-bar may be directly connected to or become a part of the shaft 1 to give it a motion of translation.

The indicating and recording mechanism herein described as adapted to a hydraulic-power plant can be adapted to a variety of other purposes where quantities of any kind based upon factors governing their magnitude are required to be indicated or recorded. Quantities of power or flow of water, gas, oil, electricity, steam, vapors, &c., can therefore be indicated or recorded.

In generating the operative surface of the cams the factors governing the position of the radii-vectores instead of being those of head, opening of wheel-gate, and speed of wheel may be any one or any group of the factors—pressure, temperature, pressure due to velocity, velocity, position, &c. For example, the device shown in Fig. 16 operates for the factor of pressure. The rack-bar 384 is an extension of the piston-rod 385, which carries the piston 386, operating against the pressure of the spiral spring 387 within the cylinder 388. Pressure is brought to bear upon the piston 386 through the pipe 389, communicating with the source of pressure. The rack-bar 384 is adapted to intermesh with the pinion 363 in the transmitter shown in Fig. 15 and transmit an impulse due to variation in pressure to operate as a factor in the indicating and recording mechanism.

For the factor of temperature a device similar to that shown in Fig. 19 may be used. 390 and 391 are riveted strips of different expansibility readily moving for changes of temperature. At the upper moving end is pivoted the rod 392, the other end of which has pivoted to it the rack-bar 393, which is adapted to operate with the pinion 363 on the transmitter shown in Fig. 15 in a manner similar to the device shown in Fig. 16. For the factor of pressure due to velocity the device shown in Fig. 17 is employed.

The rack-bar 394 is an extension of the piston-rod 395, which carries the piston 396, operating against the pressure of the spiral spring 397. Within the cylinder 398 399 is a conduit which is connected to the cylinder 398 by the pipe 400 to communicate the pressure on the inner wall of the conduit to the left-hand face of the piston 396. A pipe 401 communicates at its upper end with the right-hand end of the cylinder 398, its lower end extending into the conduit 399. A Pitot tube 402 is attached within the conduit to the tube 401 to communicate the combined internal pressure of the conduit and the pressure due to velocity to the right-hand face of the piston 396. The force which operates the rack-bar 394 is the difference in the pressures on the opposite faces of the piston 396, which is the pressure due to velocity. The rack-bar 394 is adapted to operate with the pinion 363 in the transmitter shown in Fig. 15.

In the event of there being only one factor to effect a reading on the chronographic sheet the cam operating the rider would be based upon a simple curve of generation, in which case the inner and outer curves of the cam would be identical, as clearly shown in Fig. 7$^a$, and the angles A' A$^2$, &c., would be proportional to the size of the factor governing the quantities Q' Q$^2$, &c.

I claim—

1. An indicating and recording mechanism for measurement of fluids in conduits or motors, consisting of a cam, the operative surface of which is generated by a curve or curves the ordinates of which represent to scale, the results of tests or computations made upon the conduit or motor for quantities of discharge or power, a rider provided with an indicating-point used to denote upon a fixed scale or chronographic sheet the quantities of discharge or power and having a bearing contact, with the operative surface of the cam, and intervening mechanism between the cam and the conduit or motor for giving such cam movement for changes in the factor or factors which govern the magnitude of the ordinates of the operative surface of the cam.

2. An indicating and recording mechanism for measurement of fluids in conduits or motors, consisting of a cam, the operative surface of which is generated by a curve or curves, the ordinates of which represent to scale, the results of tests or computations made upon the conduit or motor for quantities of discharge or power, a rider provided with an indicating-point used to denote upon a fixed scale or chronographic sheet the quantity of discharge or power and having a bearing contact with the operative surface of the cam, an electric transmitter and connections with the conduit or motor and intervening mechanism between the electric transmitter and cam, for giving to such cam movement for changes in the factor or factors which govern the magnitude of the ordinates of the operative surface of the cam.

3. An indicating and recording mechanism for measurement of fluids in conduits or motors consisting of a cam the operative surface of which is generated by a curve or curves the ordinates of which represent to scale the results of tests or computations made upon the conduit or motor for quantities of discharge or power, a rider provided with an indicating-point used to denote upon a fixed scale or chronographic sheet the quantity of discharge or power and having a bearing contact with the operative surface of the cam, intervening mechanism between the cam and the conduit or motor for giving such cam movement for changes in the factors which govern the magnitude of the ordinates of the operative surface of the cam, an auxiliary cam the operative surface of which is generated by a curve or curves the ordinates of which represent the fractions or percentages that the ordinates, as indicated upon a fixed scale or chronographic sheet, are of the respective ordinates of the main cam, mechanism for operating such auxiliary cam in conjunction with the main cam, and intervening mechanism between the auxiliary cam and conduit or motor, each cam having a separate rider and both riders being connected by a system of levers which operate a common indicator, for indicating on a scale or for tracing upon a chronographic sheet, a resultant reading.

4. An indicating and recording mechanism for measurement of fluids in conduits or motors consisting of a cam, the operative surface of which is generated by a curve or curves the ordinates of which represent to scale, the results of tests or computations made upon the conduit or motor for quantities of discharge or power, a rider provided with an indicating-point, used to denote upon a fixed scale or chronographic sheet the quantity of discharge or power and having a bearing contact with the operative surface of the cam, an electric transmitter and connections with the conduit or motor, intervening mechanism between the electric transmitter and cam for giving to such cam movement for changes in the factor or factors which govern the magnitude of the ordinates of the operative surface of the cam, an auxiliary cam the operative surface of which is generated by a curve or curves, the ordinates of which represent the fractions or percentages that the ordinates, as indicated upon the fixed scale or chronographic sheet, are of the respective ordinates of the main cam, mechanism for operating such cam in conjunction with the main cam, and intervening mechanism between the auxiliary cam and conduit or motor, each cam having a separate rider and both riders being connected by a system of levers, which operate a common indicator for indicating upon a scale or for tracing upon a chronograph-sheet, a resultant reading.

5. In an indicating and recording mechanism for measurement of fluids in conduits or motors the combination with a shaft, adapted for motion of translation, a gear-wheel pivoted to such shaft, a cam upon such shaft and partaking of its motion of translation and having its operative surface generated by a curve or curves the ordinates of which represent to scale, the results of tests or computations made upon the conduit or motor for quantities of discharge or power, and an indicating-rider in operative contact with such cam-surface, of rack-bars in engagement with the gear-wheel upon the shaft and mechanism interposed between such rack-bars and the conduit or motor for reciprocating the rack-bars and giving to the shaft a motion of translation.

6. In an indicating and recording mechanism for measurement of fluids in conduits or motors the combination with a shaft, adapted for motion of translation, a gear-wheel pivoted to such shaft, a cam upon such shaft and partaking of its motion of translation and having its operative surface generated by a curve or curves, the ordinates of which represent to scale the results of tests or computations made upon the conduit or motor for quantities of discharge or power, and an indicating-rider in operative contact with such cam-surface, of rack-bars in engagement with the gear-wheel upon the shaft, an electric transmitter in connection with the conduit or motor and mechanism interposed between such rack-bars and the electric transmitter for reciprocating the rack-bars and giving to the shaft a motion of translation.

7. In an indicating and recording mechanism for measurement of fluids in conduits or motors the combination with a shaft, a cam revoluble upon such shaft and having its operative surface generated by a curve or curves the ordinates of which represent to scale, the results of tests or computations made upon the conduit or motor for quantities of discharge or power and an indicating-rider in operative contact with such cam-surface, of a gear-wheel revolving about the shaft, means upon such gear-wheel and in engagement with the cam for rotating same, and mechanism interposed between the gear-wheel and the conduit or motor for revolving the cam.

8. In an indicating and recording mechanism for measurement of fluids in conduits or motors, the combination with a shaft, a cam revoluble upon such shaft and having its operative surface generated by a curve or curves the ordinates of which represent to scale the results of tests or computations made upon the conduit or motor for quantities of discharge or power and an indicating-rider in operative contact with such cam-surface, of a gear-wheel revolving about the shaft, means upon such gear-wheel and in engagement with the cam, for rotating the same, an electric transmitter connected with the conduit or motor and mechanism interposed between the gear-wheel and the electric transmitter for revolving such cam.

9. In an indicating and recording mechanism for measurement of fluids in conduits or motors, the combination with the rack-bar or gear-wheel and their respective cams of a pivoted lever provided with separate pawls for giving to the rack-bar or gear-wheel movements in opposite directions, an intermediate arm on the pivoted lever, tripping-levers pivoted to the intermediate arm, locking-levers pivoted to the frame independent of the intermediate arm and adapted for engagement with the rack-bar or gear-wheel and the tripping-levers, armatures upon the pivoted lever, magnets for operation with the armatures, an electric transmitter connected to the magnets and to the conduit or motor all combined and operating substantially as and for the purpose stated.

10. In an indicating and recording mechanism for measurement of fluids in conduits or motors, the combination with the rack-bar or gear-wheel and their respective cams of a pivoted lever provided with separate pawls for giving to the rack-bar or gear-wheel movements in opposite directions, an intermediate arm on the pivoted lever tripping-levers pivoted to the intermediate arm, locking-levers pivoted to the frame independent of the intermediate arm and adapted for engagement with the rack-bar or gear-wheel and the tripping-levers, armatures upon the pivoted lever, magnets for operation with the armatures, an electric transmitter connected to the magnets and conduit or motor and means connected with the pivoted lever and the magnets for introducing a local or stronger circuit through the magnets all combined and operating substantially as and for the purpose stated.

11. In an indicating and recording mechanism for measurement of fluids in conduits or motors, the combination with the gear-wheel 62, the main cam 72, the shaft 119, and the auxiliary cam 122 on the shaft 119, of the gear-wheel 111 intermeshing with the gear-wheel 62 employed to rotate the main cam 72, the shaft 112 upon which the gear-wheel 111 is mounted pinion 114 mounted on the shaft 112, the gear-wheel 115 intermeshing with the pinion 114, the shaft 116 upon which is mounted the gear-wheel 115, the pinion 118 mounted on shaft 116 and the shaft 119 provided with the annular ribs 121 adapted to intermesh with the teeth of the pinion 118 all combined and operating substantially as and for the purpose stated.

12. In an indicating and recording mechanism for measurement of fluid in conduits or motors the combination with the vertical rider, the main cam, the horizontal rider and the auxiliary cam, of a horizontal rod carrying a marker, means for preserving the horizontality of the marker-rod in its varying positions, a projecting arm on the vertical rider, a vertical rod on the horizontal rider, a vertical socket in which the vertical arm of the horizontal rider reciprocates a horizontal socket in which the horizontal, marker-rod reciprocates, a rod rigidly connecting the vertical and horizontal sockets, an inclined lever pivoted to the main frame, and a groove in an arm of the inclined lever adapted for the sliding reception of the outer end of the projecting arm on the vertical rider, the connecting-rod between the two sockets having a sliding contact with the upper side of the inclined pivoted lever all combined and operating to give to the marker a resultant movement for indicating or recording the quantities of discharge or power of the conduit or motor.

13. In an indicating and recording mechanism for measurement of fluids in conduits or motors the combination with the magnet, its armature and the pivoted lever which carries the armature, of a spring insulated from the magnet, its rigid end being connected to the magnet-wire, a pin on the pivoted lever for operative contact with the free end of the spring, an auxiliary armature on the spring for operative engagement with the core of the magnet, the local circuit which is first completed through the contact of the free end of the spring with the pin on the pivoted lever and then broken by the sliding escape of the free end of the spring from engagement with the pin on the pivoted lever, extends from the pin on the pivoted lever through the lever and connecting framework to the generator-wire, through the generator through a connecting-wire, to and through the magnet, then by wire to the spring, the magnet having previously been energized by a different circuit.

14. In an indicating and recording mechanism for measurement of fluids in conduits or motors the combination with an electric transmitter, a circuit, a generator, a magnet, an armature and a pivoted lever which carries the armature, of a spring insulated from the magnet, its rigid end being connected to the magnet-wire, a pin on the pivoted lever for sliding operative contact with the free end of the springs an auxiliary armature on the spring for operative engagement with the core of the magnet, an insulated post against which the spring impacts on the breaking of the circuit to deaden its vibration, the local circuit which is first completed through the contact of the free end of the spring with the pin on the pivoted lever and then broken by the sliding escape of the free end of the spring from engagement with the pin on the pivoted lever, extends from the pin on the pivoted lever and connecting framework to the generator, through the generator, through a connecting-wire to and through the magnet, then by wire to the spring, the magnet having previously been energized by a different circuit.

15. In an indicating and recording mechanism for measurement of fluids in conduits or motors, an electric transmitter for successively closing and breaking the circuit consisting of a series of projecting pins mounted upon a movable surface, a movable arm in engagement with the frame, a T-piece pivoted to the movable arm, consisting of a lever for successive engagement with the pins and of contacting arms on opposite sides of the lever, means for returning the T-piece to its normal position, insulated contact-pieces secured to the frame and adapted for contact with the contacting arms of the T-piece to close the circuit, means for limiting the movements of the T-piece on the movable rod, and means for separating the contacting arms from the contact-strips for breaking the circuit, the movable arm and the contact-strips being connected with an electric circuit.

16. In an indicating and recording mechanism for measurement of fluids in conduits or motors, an electric transmitter for successively closing and breaking the circuit consisting of a series of projecting pins mounted upon a movable surface, a movable arm in engagement with the frame, a T-piece pivoted to the movable arm, consisting of a lever for successive engagement with the pins and of contacting arms on opposite sides of the lever, means for returning the T-piece to its normal position, insulated contact-pieces secured to the frame and adapted for contact with the contacting arms of the T-piece to close the circuit, means for limiting the movement of the T-piece on the movable arm, means for separating the contacting arms from the contact-strips for breaking the circuit, and locking-levers pivoted to the frame and operated by the movable rod to throw them in and out of engagement with the pins on the movable surface, the movable arm and the contact-strips being connected with the electric circuit.

17. In an indicating and recording mechanism for measurement of fluids in conduits or motors, the combination with the movable surface of the transmitter carrying the operating-pins, of a fly geared to such movable surface for retarding a too rapid movement of such surface and a device for harmonizing the irregular movements of a shaft geared to the transmitter, with the motion of the movable surface, consisting of two contiguous gear-wheels one of which is connected with the movable surface, a rigid pin on each gear-wheel at different distances from their respective centers, two arms pivoted to the gear-wheel connected with the movable surface, and a spring connecting the two arms and serving to press them against the two rigid pins to normally preserve their position in the same radial line and to return them to such normal position when displaced in operating the transmitter.

In testimony whereof I have signed my name to this specification in the presence of two subscribing witnesses.

JOHN EDWARD THEBAUD.

Witnesses:
   W. T. MILLER,
   C. B. BUTLER.